G. M. Wells,
Pegging Jack,

No. 77,425. Patented Apr. 28, 1868.

Witnesses:
S. N. Piper
J. R. Snow

Inventor:
George M. Wells
by his attorney
R. N. Edd

United States Patent Office.

GEORGE M. WELLS, OF CHICAGO, ILLINOIS, ASSIGNOR TO MOSES D. WELLS, OF SAME PLACE.

Letters Patent No. 77,425, dated April 28, 1868.

LAST-HOLDER OR JACK.

*The Schedule referred to in these Letters Patent and making part of the same.*

TO ALL PERSONS TO WHOM THESE PRESENTS MAY COME:

Be it known that I, GEORGE M. WELLS, of Chicago, in the county of Cook, and State of Illinois, have invented a new useful Last-Holder or Jack; and I do hereby declare the same to be fully described in the following specification, and represented in the accompanying drawings, of which—

Figure 1:
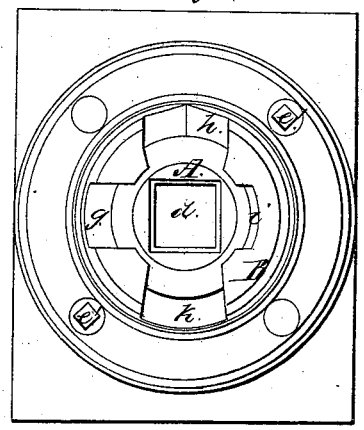
Figure 2:
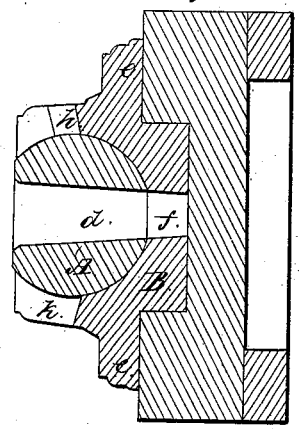
Figure 3:
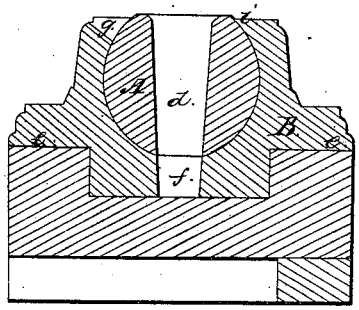

Figure 1 is a top view,

Figures 2 and 3 cross-sections, and

Figure 4:
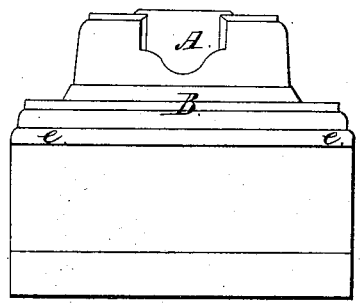

Figure 4 a side elevation of it.

Figure 5:
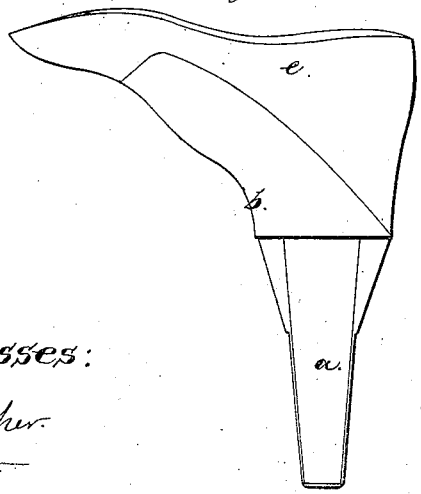

Figure 5 is a side elevation, and

Figure 6:
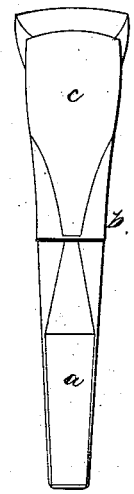

Figure 6 a rear view of the last, to be used with and holden by such jack.

The last has a horn shank, $a$, to extend from its instep part $b$, the latter being separate from the foot portion, $c$, of the last, and connected to it by a curved dove-tailed tenon and groove, the same being as shown in a patent recently granted to me or my assignee, M. D. Wells.

The purpose of my present invention is to support such a last, and enable it to be revolved horizontally, or be turned down and supported in one or more inclined positions, as may be desirable, during the process of making or finishing a shoe while on such a last.

In the drawings, A denotes a block or sphere, having a pyramidal or tapering hole or socket, $d$, extending down through it.

Upon the said block or ball, when placed within a mould, I cast a metallic carrier, B, to extend both above and below the centre of the ball, in manner as represented. This carrier I form with a flange, $e$, to project from its base or lower part, for the purpose of enabling the carrier to be fastened to the top of a bench by screws or bolts going through holes $e'$ $e'$ made through the flange. Furthermore, I cast the carriage with a passage or cavity, $f$, arranged in or through its base, at the centre thereof, such being to receive the shank $a$ of the last, when such shank may extend through and project below the ball or turning-block B.

Furthermore, I form in the upper part of the carrier, and so as to radiate from the ball, a series of notches or recesses, of different sizes, as shown at $g$ $h$ $i$ $k$ in the drawings, each of them being to receive the shank of the last, when the said last is turned down into an inclined position, so as to bring the shank into it.

When the shank is in a vertical position it will be in the passage $f$, as well as in the ball, and thus the said passage, with its shank, while the shank may be within it, will serve to prevent any rotary movement of the ball.

I find that by casting the carrier in one piece on the ball, I am enabled to form the socket for the ball to rest in. It is well to heat the ball to redness preparatory to the metal being cast upon it, it being kept hot while the casting may take place, as the ball will expand in being so heated, and afterward, when it may contract by cooling, it will be found sufficiently loose in its socket to be capable of being easily revolved or turned about therein.

Furthermore, the casting of the carrier in one piece on the ball saves the necessity of making the carrier in two separate pieces, in order to get the ball within it, and properly support it.

I do not claim a mere ball and socket, as ordinarily constructed, and used for various purposes in the arts.

What I do claim as my invention is as follows:

I claim the rotary block or ball A, as constructed, with a shank-recess socket, $d$, and combined with a carrier, B, formed to receive such ball, as set forth.

I also claim the carrier B, as cast with an opening through its bottom, and in one piece on the rotary block or ball, provided with a shank-socket, as set forth.

I also claim the carrier B, as cast in one piece, upon the rotary block or ball, and with an opening through its bottom, and a fastening-flange projecting from its sides, all as specified.

GEO. M. WELLS.

Witnesses:
R. H. EDDY,
F. P. HALE, Jr.